United States Patent
Rodman et al.

(10) Patent No.: US 10,908,377 B1
(45) Date of Patent: Feb. 2, 2021

(54) MICRODUCT MANIFOLD FITTING

(71) Applicant: ARIA Technologies, Inc., Livermore, CA (US)

(72) Inventors: Daniel Lewis Rodman, Walnut Creek, CA (US); Ryan Michael Gilbert, Pleasanton, CA (US)

(73) Assignee: ARIA Technologies, Inc., Livermore, CA (US)

( * ) Notice: Subject to any disclaimer, the term of this patent is extended or adjusted under 35 U.S.C. 154(b) by 0 days.

(21) Appl. No.: 16/506,921

(22) Filed: Jul. 9, 2019

Related U.S. Application Data

(60) Provisional application No. 62/725,226, filed on Aug. 30, 2018.

(51) Int. Cl.
  *G02B 6/44* (2006.01)
(52) U.S. Cl.
  CPC ......... *G02B 6/4459* (2013.01); *G02B 6/4429* (2013.01); *G02B 6/4463* (2013.01)
(58) Field of Classification Search
  CPC .............................. G02B 6/4459; G02B 6/4429
  See application file for complete search history.

(56) References Cited

U.S. PATENT DOCUMENTS

| | | | | |
|---|---|---|---|---|
| 4,424,412 A * | 1/1984 | Goetter | ................ | H02G 15/013 174/77 R |
| 5,078,432 A * | 1/1992 | Seiter | ...................... | F16L 39/00 285/124.3 |
| 6,875,926 B2 * | 4/2005 | Buekers | ............... | G02B 6/4444 174/100 |
| 7,581,976 B2 * | 9/2009 | Liepold | ..................... | F16L 5/08 439/282 |
| 7,650,055 B2 * | 1/2010 | Cox | ...................... | G02B 6/4444 174/60 |
| 7,780,173 B2 * | 8/2010 | Mullaney | .................. | F16L 5/08 174/77 R |
| 8,686,289 B2 * | 4/2014 | Burke | .................. | H02G 15/013 174/77 R |
| 9,244,238 B2 * | 1/2016 | Claessens | ............ | G02B 6/4444 |

(Continued)

FOREIGN PATENT DOCUMENTS

| WO | WO-2012168292 A2 * | 12/2012 | ........... G02B 6/4471 |
|---|---|---|---|
| WO | WO-2013100338 A1 * | 7/2013 | ........... G02B 6/4459 |

*Primary Examiner* — Sung H Pak
(74) *Attorney, Agent, or Firm* — Adibi IP Group, PC; Amir V. Adibi; Daniel D. Tagliaferri

(57) ABSTRACT

A microduct manifold fitting includes an end cap, a gasket, a plurality of microduct couplers, a bottom portion, a top portion, and an optical enclosure attachment mechanism. The microduct manifold has a plurality of microduct openings disposed at a lower end and one fiber opening disposed at an upper end. The upper end of the microduct manifold extends into an opening of an optical enclosure and the optical enclosure attachment mechanism secures and seals the top portion to the optical enclosure. The optical enclosure is disposed in an outside environment, and the enclosure receives and splits an outside plant cable to individual fibers. The fibers are extended through the fiber opening of the microduct manifold, through the individual microducts via the microduct couplers, and to various optical equipment within a building that desire network connectivity. The microduct manifold shields fibers within the optical enclosure and microducts from the outside environment.

19 Claims, 23 Drawing Sheets

EXPLODED VIEW OF MICRODUCT MANIFOLD FITTING AND MICRODUCT COUPLERS

(56) References Cited

U.S. PATENT DOCUMENTS

| | | | |
|---|---|---|---|
| 10,088,644 B2* | 10/2018 | Wakileh | G02B 6/3897 |
| 2004/0144555 A1* | 7/2004 | Buekers | G02B 6/4444 |
| | | | 174/653 |
| 2007/0145743 A1* | 6/2007 | Greenberger | F16L 41/023 |
| | | | 285/322 |

* cited by examiner

OUTDOOR FIBER OPTIC ENCLOSURE ROUTES FIBER OPTIC CABLES FROM EXTERNAL TO INTERNAL ENVIRONMENT

OSP CABLE INTO OPTICAL ENCLOSURE, FIBERS SPLIT AND PASSED TO MICRODUCTS VIA MICRODUCT MANIFOLD FITTINGS

SIDE AND CROSS-SECTION VIEWS OF MICRODUCT
MANIFOLD FITTING WITH MICRODUCT COUPLERS

EXPLODED VIEW OF MICRODUCT MANIFOLD FITTING AND
MICRODUCT COUPLERS

PERSPECTIVE VIEW OF MICRODUCT MANIFOLD FITTING
HAVING MICRODUCTS AND RUBBER PLUGS

SIDE PERSPECTIVE VIEW OF OUTDOOR FIBER OPTIC
ENCLOSURE WITH MICRODUCT MANIFOLD FITTING

FIBERS IN OPTICAL ENCLOSURE EXTEND THROUGH
MICRODUCTS VIA MANIFOLD INTO OPTICAL EQUIPMENT

FRONT PERSPECTIVE VIEW OF OUTDOOR FIBER OPTIC
ENCLOSURE WITH MICRODUCT MANIFOLD FITTINGS

SIDE PERSPECTIVE VIEW OF OUTDOOR FIBER OPTIC
ENCLOSURE WITH MICRODUCT MANIFOLD FITTINGS

BACK PERSPECTIVE VIEW OF OUTDOOR FIBER OPTIC
ENCLOSURE WITH MICRODUCT MANIFOLD FITTINGS

BOTTOM PERSPECTIVE VIEW OF OUTDOOR FIBER OPTIC
ENCLOSURE WITH MICRODUCT MANIFOLD FITTINGS

FRONT PERSPECTIVE VIEW OF OUTDOOR FIBER OPTIC
ENCLOSURE WITH MICRODUCT MANIFOLD FITTINGS
(DOOR OF ENCLOSURE REMOVED)

TOP PERSPECTIVE VIEW OF OUTDOOR FIBER OPTIC
ENCLOSURE WITH MICRODUCT MANIFOLD FITTINGS
(DOOR OF ENCLOSURE REMOVED)

FRONT PERSPECTIVE VIEW OF THE MICRODUCT MANIFOLD FITTING

BOTTOM PERSPECTIVE VIEW OF THE MICRODUCT
MANIFOLD FITTING

TOP PERSPECTIVE VIEW OF THE MICRODUCT MANIFOLD FITTING

TOP VIEW OF THE
MICRODUCT MANIFOLD

SIDE VIEW OF THE
MICRODUCT MANIFOLD

BOTTOM VIEW OF THE
MICRODUCT MANIFOLD

PERSPECTIVE VIEW OF THE
MICRODUCT MANIFOLD

CROSS SECTIONAL VIEW OF
THE MICRODUCT MANIFOLD

EXPLODED VIEW OF THE MICRODUCT
MANIFOLD WITHOUT MICRODUCT COUPLERS

SIDE VIEW OF THE
BOTTOM PORTION

SECTION D-D
CROSS-SECTION VIEW OF
THE BOTTOM PORTION

BOTTOM VIEW OF THE
BOTTOM PORTION

PERSPECTIVE VIEW OF THE
BOTTOM PORTION

TOP VIEW OF THE TOP PORTION

PERSPECTIVE VIEW OF THE TOP PORTION

SIDE VIEW OF THE TOP PORTION

SECTION E-E
CROSS-SECTION VIEW OF THE TOP PORTION

TOP VIEW OF THE GASKET

CROSS-SECTION VIEW OF
THE GASKET

PERSPECTIVE VIEW OF THE
GASKET

SIDE VIEW OF THE END CAP

PERSPECTIVE VIEW OF THE END CAP

BOTTOM VIEW OF THE END CAP

SECTION B-B

CROSS-SECTION VIEW OF THE END CAP

TOP VIEW OF THE HEX NUT

PERSPECTIVE VIEW
OF THE HEX NUT

SIDE VIEW OF THE HEX NUT

MICRODUCT MANIFOLD FITTING

CROSS-REFERENCE TO RELATED APPLICATION

This application claims the benefit under 35 U.S.C. § 119 of U.S. Provisional Application Ser. No. 62/725,226, filed on Aug. 30, 2018, and entitled "Attaching Microduct Manifold Fittings Onto Outdoor Fiber Optic Enclosures," which is incorporated herein by reference in its entirety.

TECHNICAL FIELD

The described embodiments relate generally to fiber optic communications equipment, and more particularly to outdoor fiberoptic enclosures.

BACKGROUND INFORMATION

Optical enclosures are often used to split optical cabling from an outside network and to route individual fibers to optical equipment inside of a building. The optical enclosures are typically exposed to outside elements, including water, moisture, wind, and extreme temperature. Optical fibers are susceptible to damage when exposed to such adverse elements. Microducts are often used to carry and shield optical fibers from the outside environment. However, microducts must connect to the individual fibers within the optical enclosure. One technique is to provide openings along a surface of an optical enclosure. The microducts extends through the openings and the fiber within the optical enclosure is passed through the microducts and to the desired destination. However, these openings must be adequately sealed to prevent exposed fibers within the optical enclosure from being exposed to the outside environment. Another technique would be to provide each fiber with its own weather tight fitting. However, these fittings can be bulky and require a large mounting area. These fitting can also be very expensive, so providing a fitting for each fiber may not be cost effective. A solution that overcomes these challenges is desired.

SUMMARY

A microduct manifold fitting is provided that quickly couples multiple optical fibers to an optical enclosure while protecting the fibers from the environment. In one embodiment, a microduct manifold fitting comprises an end cap, a gasket, a plurality of microduct couplers, a bottom portion, a top portion, and an optical enclosure attachment mechanism. The gasket is disposed between the end cap and bottom portion. The gasket seals the connection between the end cap and bottom portion and securely maintains the microduct couplers in place. The end cap, the gasket, and the bottom portion are secured together via screws. The bottom portion is connected to the top portion by screw threads. The optical enclosure attachment mechanism secures the top portion of the microduct manifold fitting to an optical enclosure.

The microduct manifold has a plurality of microduct openings disposed at a lower end and one fiber opening disposed at an upper end. The upper end of the microduct manifold extends into an opening of the outdoor optical enclosure. The optical enclosure attachment mechanism secures and seals the top portion to the outdoor optical enclosure. The outdoor optical enclosure is disposed in an outside environment. The outdoor optical enclosure receives and splits an outside plant cable to individual fibers. The fibers are extended through the fiber opening of the microduct manifold, through the individual microducts via the microduct couplers, and to various optical equipment within a building that desire network connectivity. The microduct manifold shields fibers within the optical enclosure and within the microducts from the outside environment.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
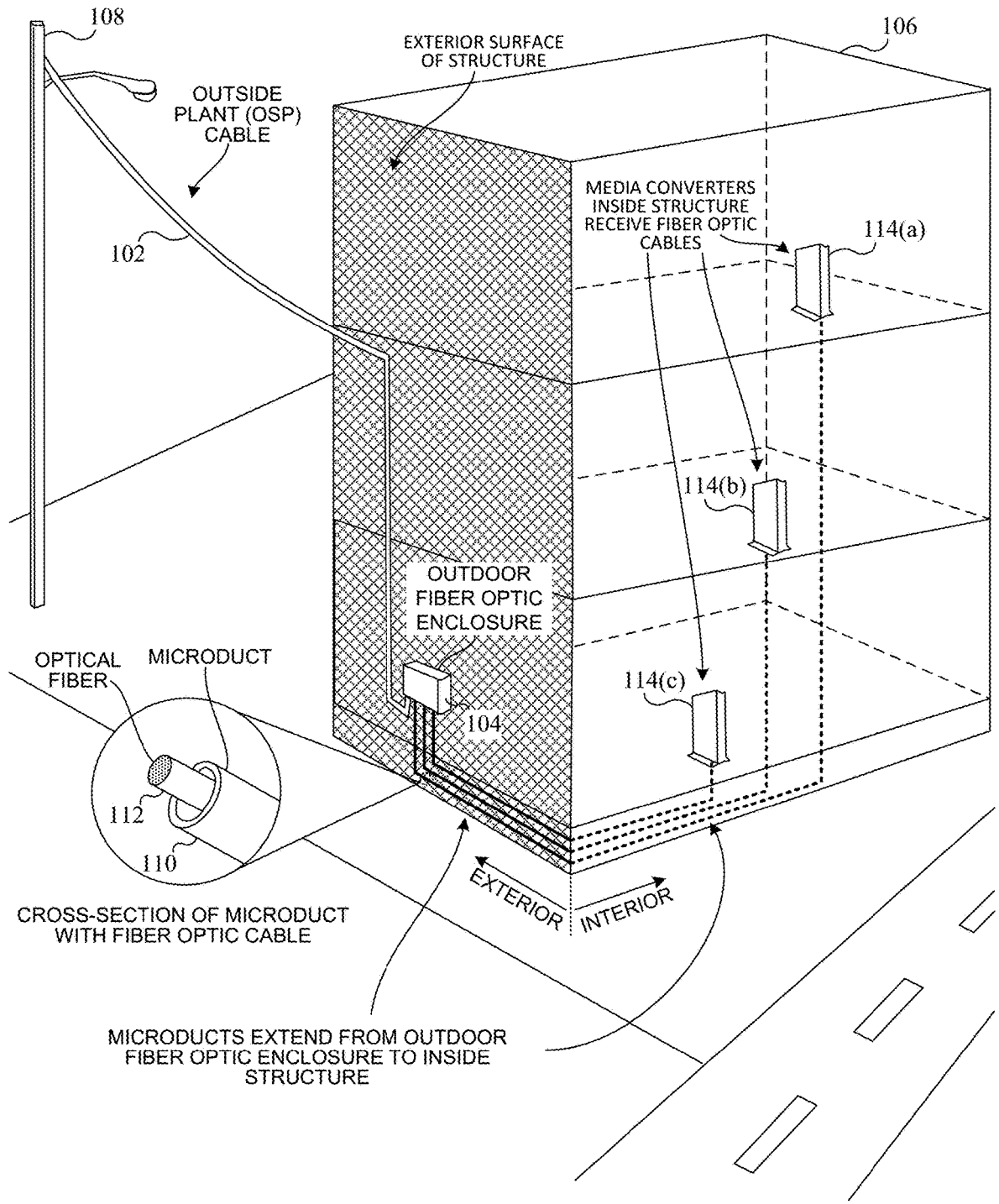
FIG. 1 is a diagram of an outdoor fiber optic enclosure that routes fiber optic cables from an outside environment to an inside environment.

FIG. 1 is a diagram of an outdoor fiber optic enclosure 104 that routes fiber optic cables from an outside environment to an inside environment. An outside plant (OSP) cable 102 extends from a service provider network to the outdoor fiber optic enclosure 104 or optical enclosure. A splitter within the outdoor fiber optic enclosure 104 splits a signal from the incoming fiber(s) into a plurality of copies of the original signal carried by a plurality of optical fibers. The optical fibers are routed to particular devices via microducts.

The outdoor fiber optic enclosure 104 is outside of a building structure 106 and is exposed to the outside environment. The outdoor fiber optic enclosure 104 is subjected to the elements, including rain, wind, storms, extreme heat and cold, and snow. The building structure 106 is a residential, commercial, government or any other type of building that has optical equipment that receives an optical fiber.

In the example of FIG. 1, the structure 106 is a multi-unit building having a plurality of media converters 114. The OSP cable 102 extends from an outdoor lamp post 108 to the outdoor fiber optic enclosure 104. A splitter is disposed within the outdoor fiber optic enclosure. The splitter receives a fiber from the OSP cable 102 and distributes a signal to a plurality of output fibers. The output fibers are then passed through microducts and extended to various media converters 114 within the building. For example, each microduct 110 comprises a single optical fiber 112 that is supplied to individual subscribers. The microduct shields and protects the optical fiber from the outside environment.

Figure 2:
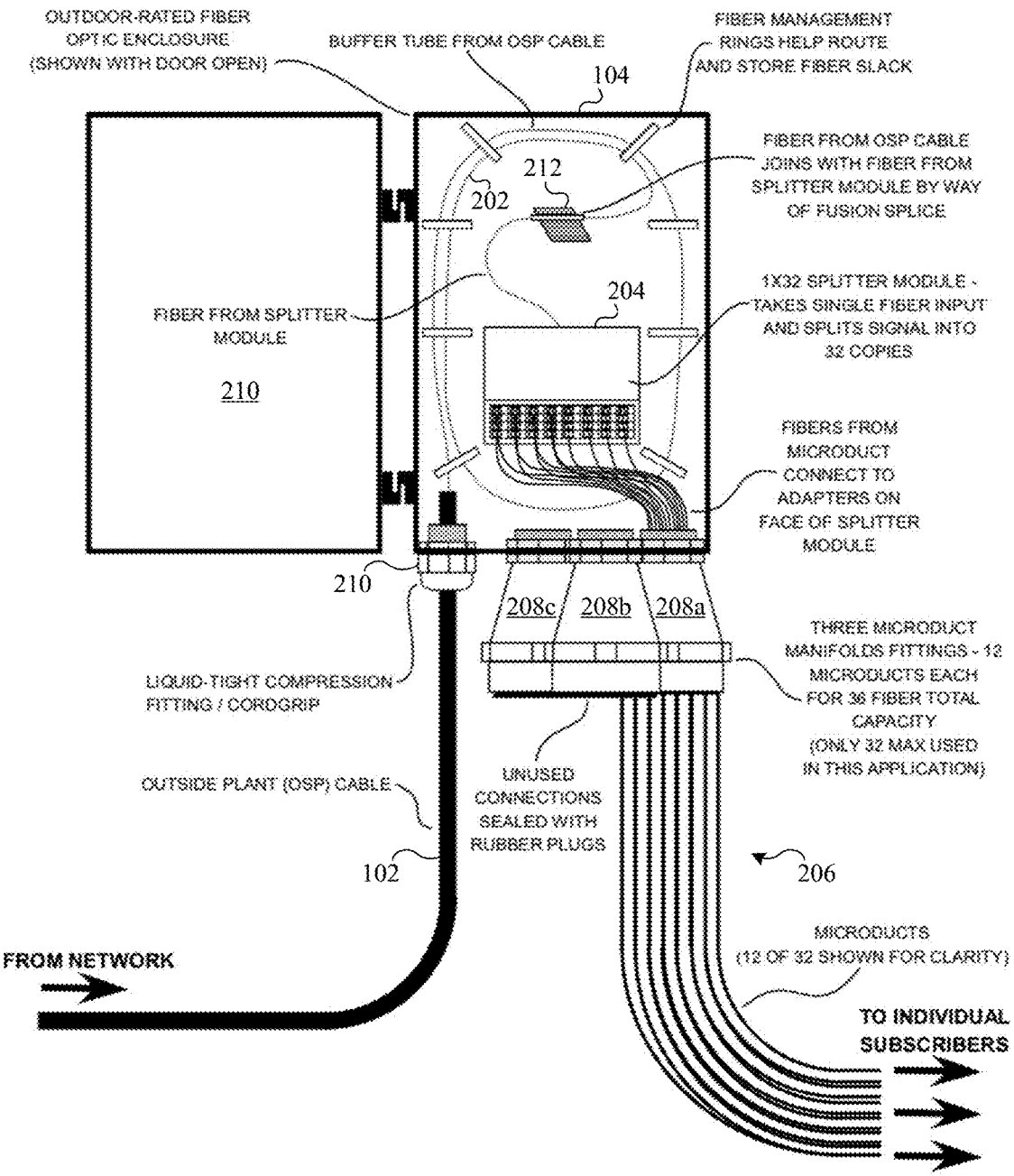
FIG. 2 is a diagram that shows how an outside plant cable connects to an outside optical enclosure and how fiber is split by a splitter module and extended into microducts via novel microduct manifold fittings.

FIG. 2 is a detailed diagram that shows the OSP cable 102 connected to the optical enclosure 104 and how a signal from an input fiber is split into a plurality of output fibers by a splitter module 204. The output fibers extend into microducts 206 via novel microduct manifold fittings 208a-c. A door 210 of the optical enclosure 104 is shown open in FIG. 2 so that the details of how fiber is passed through manifolds can be shown. In this example, three microduct manifold fittings 208a-c are attached to a bottom surface of the optical enclosure 104. Each of the three microduct manifold fittings supports twelve (12) microducts. Only twelve microducts are shown in the example of FIG. 2, and the remaining microduct openings of the other two microduct manifold fittings are sealed with rubber plugs (not shown).

An end of the OSP cable couples to the outdoor fiber optic enclosure 104 via a liquid-tight compression fitting or cord grip 210. A buffer tube from the OSP cable is extended through a plurality of fiber management rings 202. The fiber management rings 202 provide routing and support to handle fiber slack. A fusion splice 212 joins fiber from the OSP cable to fiber of the splitter module. The splitter module 204 receives a signal on a single fiber and splits the signal into a plurality of copied versions of the signal. In this example, the splitter module 204 outputs thirty-two (32) copies of the signal. The microducts 206 extend from converters in each unit of the building 106 into a microduct opening on a lower surface of the microduct manifold fittings 208a-c. Fiber from the microducts connect to adapters on a face of the splitter module 204 via the microduct manifold fittings.

Figure 3:
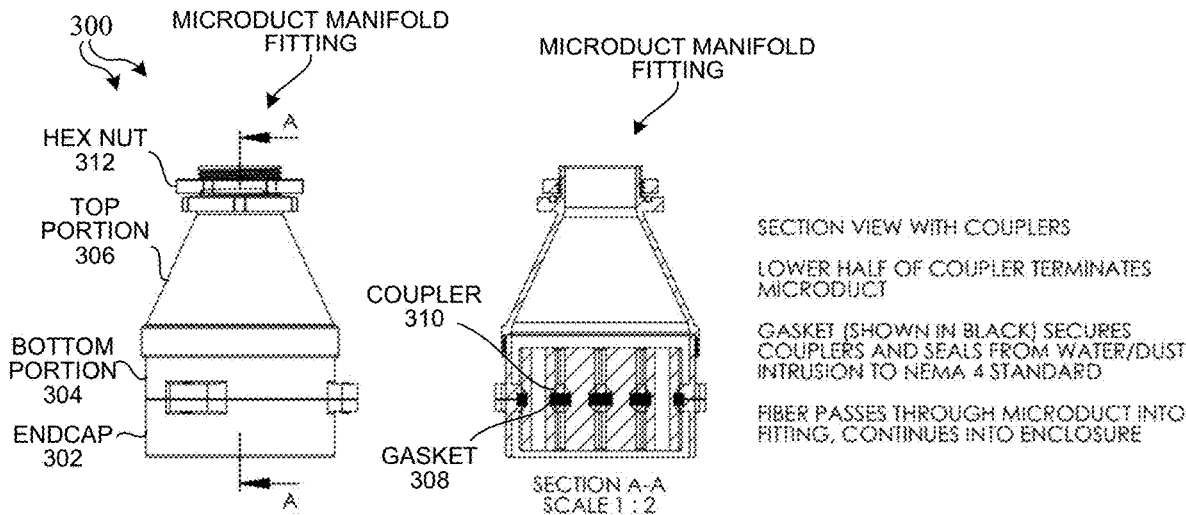
FIG. 3 is a diagram of side and cross sectional views of the microduct manifold fitting with microduct couplers.

FIG. 3 is a diagram of side and cross-section views of a microduct manifold fitting 300 with microduct couplers. For example, the microduct manifold fitting 300 is suitable for use as the microduct manifold fittings 208a-c shown in FIG. 2. The microduct manifold fitting comprises an end cap 302, a bottom portion 304, a top portion 306, a gasket 308, microduct couplers 310, and a hex nut 312. The hex nut 312 is used to secure the microduct manifold fitting to an optical enclosure. Microducts enter through the microduct openings along the bottom portion 304. The gasket 308 secures the microduct couplers 310 between the bottom portion 304 and the end cap 302. The microducts terminate at the microduct couplers. The gasket 308 between the bottom portion 304 and the end cap 302 also seals an interior of the microduct manifold fitting from the external environment.

Figure 4:
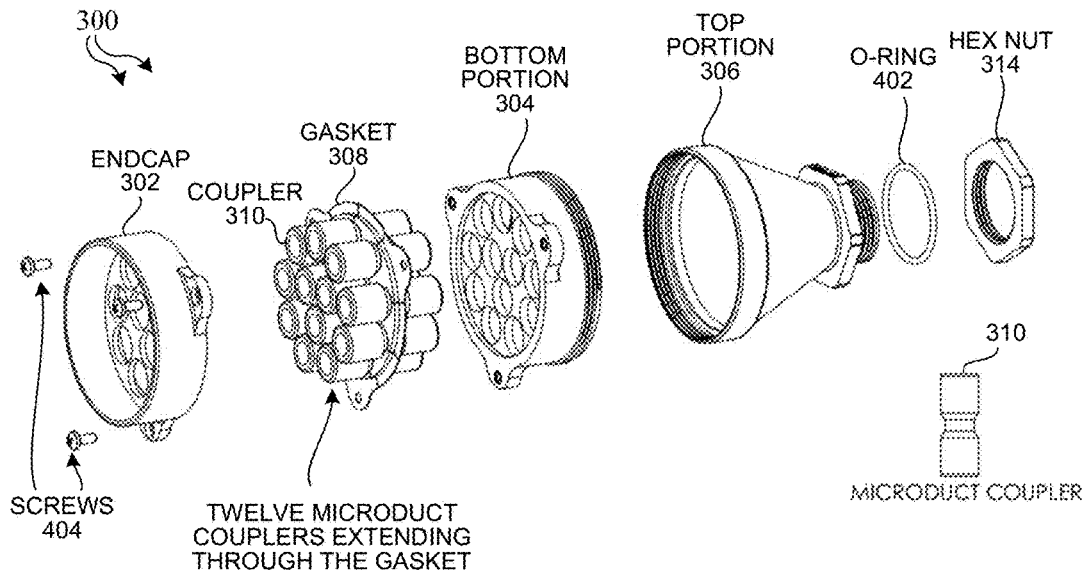
FIG. 4 is a diagram of an exploded view of the microduct manifold fitting and the microduct couplers.

FIG. 4 is a diagram of an exploded view of the microduct manifold fitting 300 and the microduct couplers 310 shown in FIG. 3. The endcap 302, the gasket 308, and the bottom portion 304 attach together via screws 404. Each of the endcap 302, the gasket 308, and the bottom portion 304 has a plurality of holes, for example, in this embodiment there are twelve holes. Each of the microduct couplers 310 is secured within the holes of the gasket 308. A lower end of each microduct coupler 310 extends through one of the holes of the end cap 302, and an upper end of each microduct coupler 310 extends through a corresponding hole of the bottom portion 304. The bottom portion 304 attaches to the top portion 306 by screwing the upper end of the bottom portion which has an external male thread into a lower end of the top portion which has an internal female thread. An O-ring 402 is disposed between the hex nut 314 and the top portion 306 to further seal the connection between the microduct manifold fitting and the optical enclosure.

Figure 5:
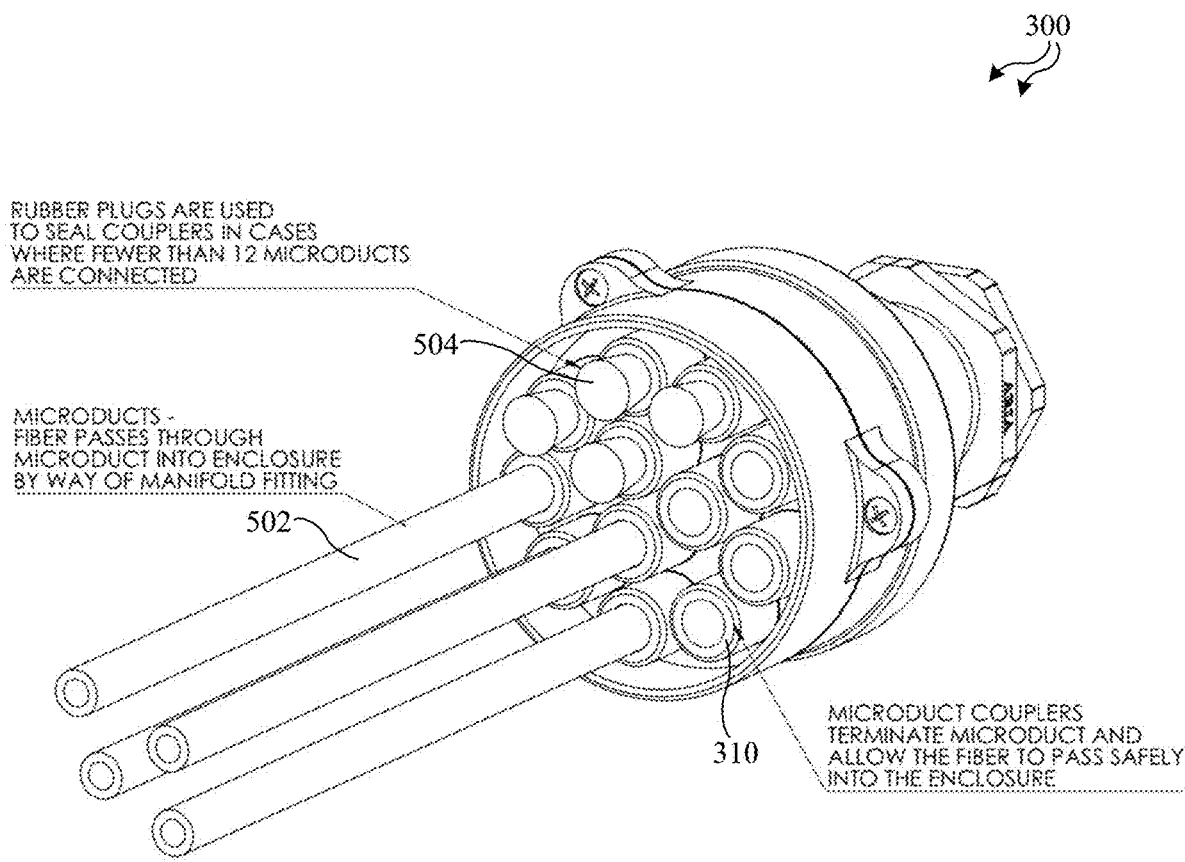
FIG. 5 is a diagram of a perspective view of the microduct manifold fitting having microducts and rubber plugs.

FIG. 5 is a diagram of a perspective view of the microduct manifold fitting 300 having microducts 502 and rubber plugs 504. The microduct manifold fitting 300 has a plurality of microduct openings at a lower end and a fiber opening at an opposite upper end. The microducts 502 pass through the microduct openings at the lower end and fibers in the microducts continue on through the manifold fitting and into the enclosure. The microduct couplers 310 terminate the microducts and provide a path (or opening) for fibers to continue into the optical enclosure. Microduct openings that are unused and do not receive a microduct are covered with rubber plugs 504 to shield the interior of the microduct manifold fitting 300 from the outer environment.

Figure 6:
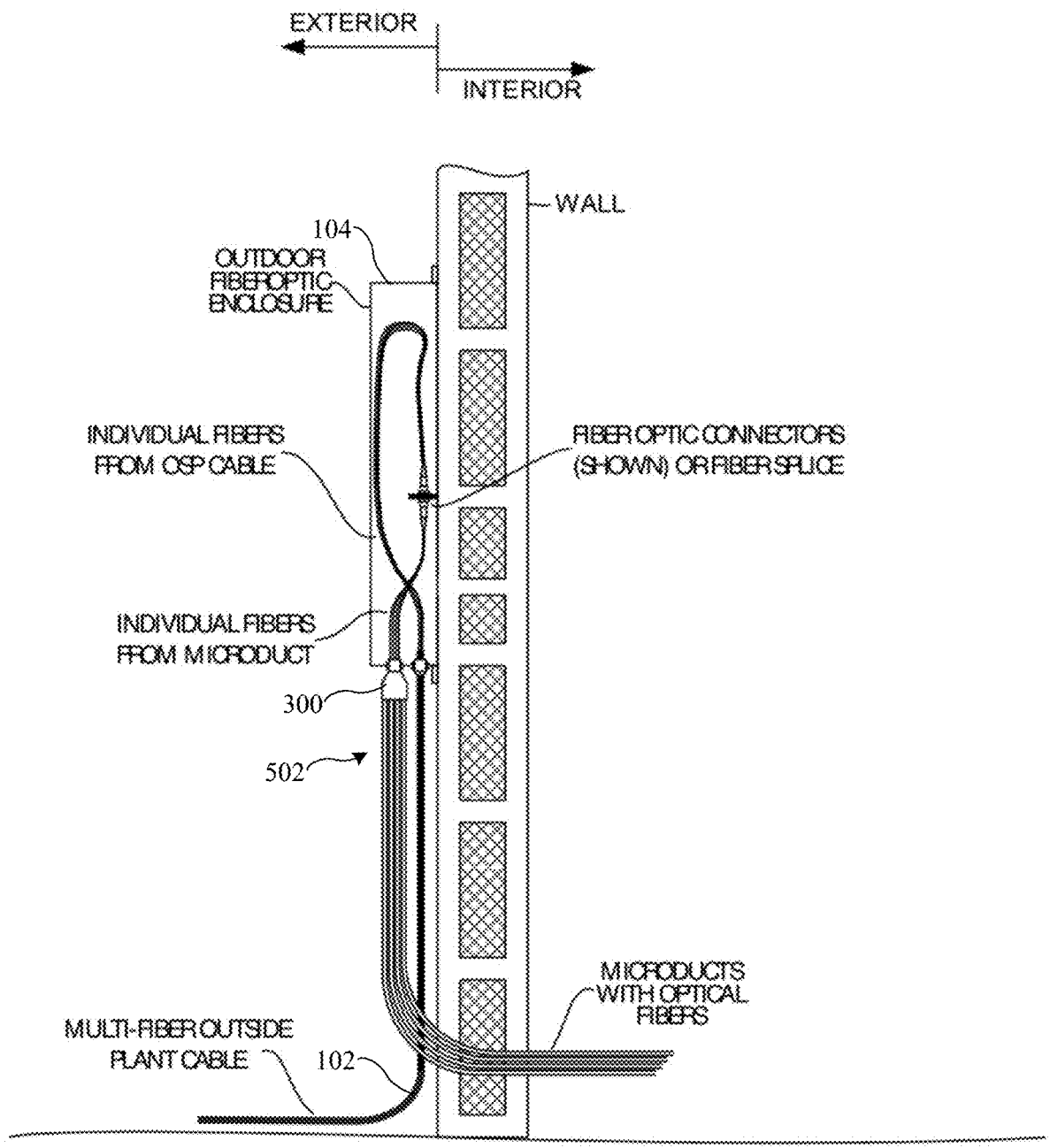
FIG. 6 is a diagram of a side perspective view of the outdoor fiber optic enclosure with the microduct manifold fitting.

FIG. 6 is a diagram of a side perspective view of the outdoor fiber optic enclosure 104 with the microduct manifold fitting 300. The microduct manifold fitting 300 seals the connection between microducts 502 and the optical enclosure 104.

Figure 7:
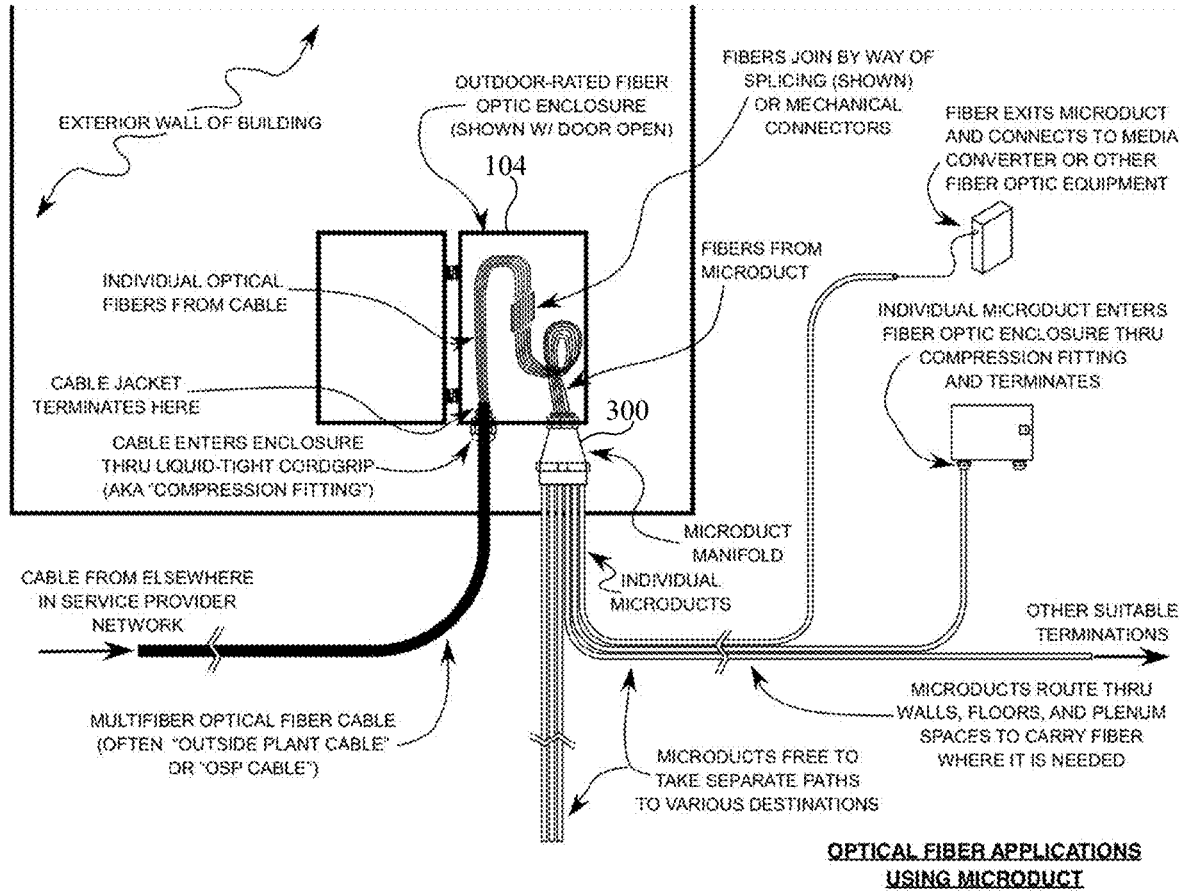
FIG. 7 is a diagram showing how fibers within the optical enclosure extend through various microducts via the microduct manifold fitting and extend to optical equipment.

FIG. 7 is a diagram showing how fibers within the optical enclosure 104 extend through various microducts via the microduct manifold fitting 300 and extend to optical equipment, such as media converters. Microducts extend from the microduct manifold fitting 300 to optical equipment within the structure. The microducts extend through walls, floor and plenum spaces to carry fiber to desired destinations.

Figure 8:
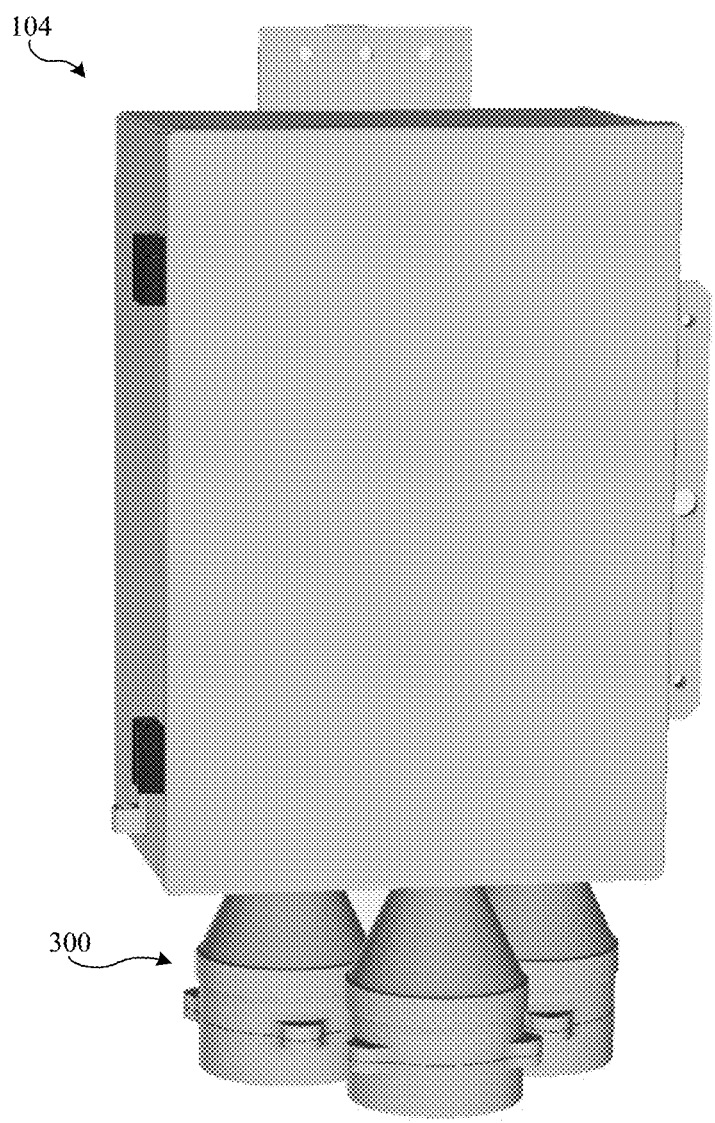
FIG. 8 is a diagram of a front perspective view of outdoor fiber optic enclosure with microduct manifold fittings.

FIG. 8 is a diagram of a front perspective view of the outdoor fiber optic enclosure 104 with microduct manifold fittings 300 that are installed on the enclosure 104. In this example, there are three microduct manifold fittings 300 attached to a bottom surface of the optical enclosure 104.

Figure 9:
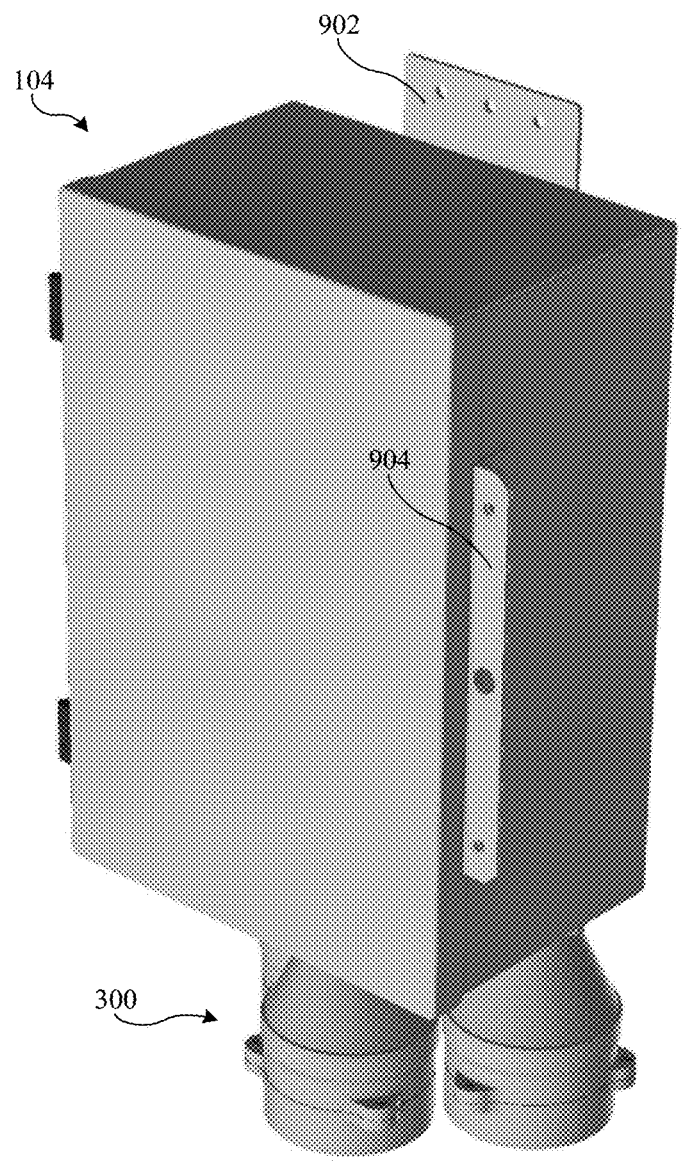
FIG. 9 is a diagram of a side perspective view of the outdoor fiber optic enclosure with three microduct manifold fittings installed.

FIG. 9 is a diagram of a side perspective view of the outdoor fiber optic enclosure 104 with three microduct manifold fittings 300 installed. Brackets 902 and 904 disposed on an upper portion and side portion of the optical enclosure 104 are used to attach and secure the optical enclosure 104 to a surface of a building structure.

Figure 10:
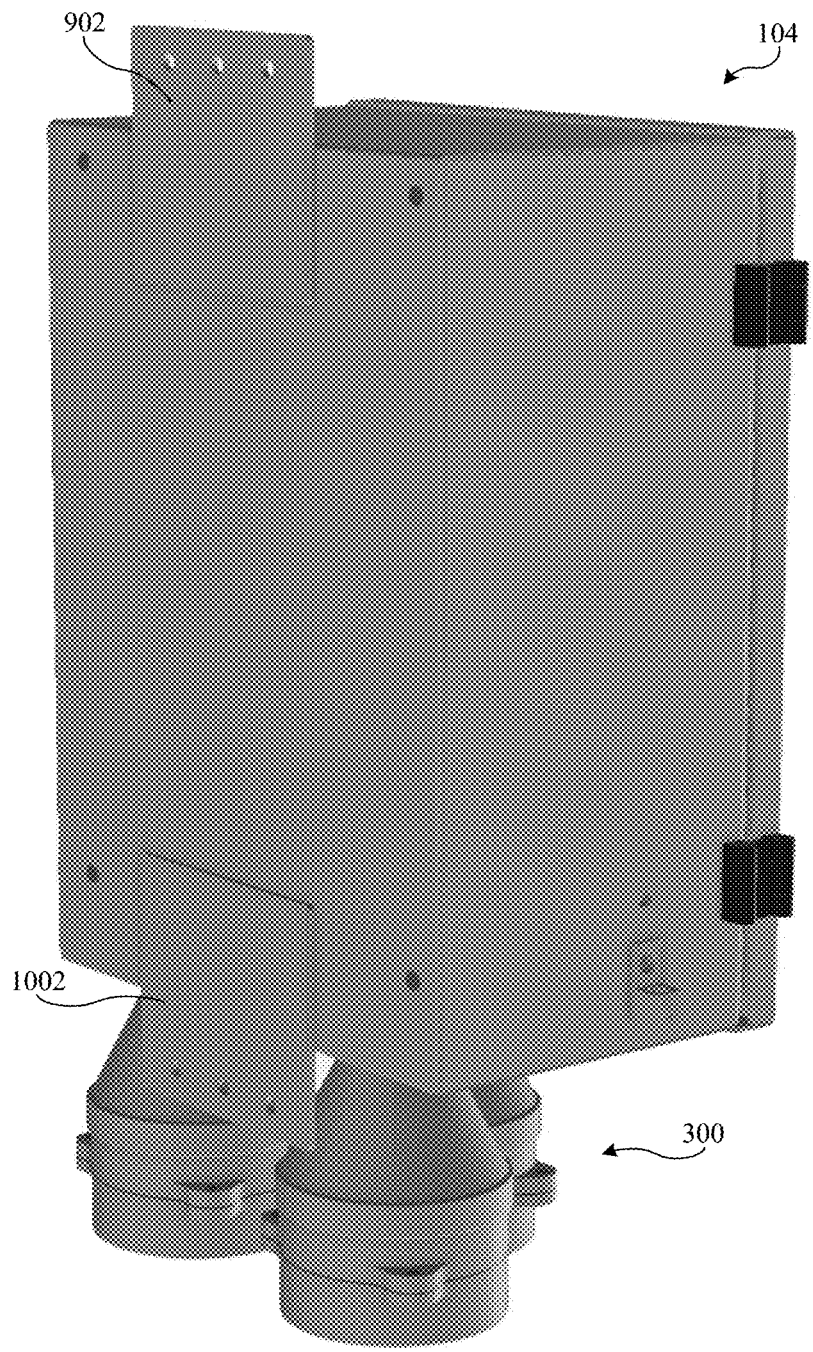
FIG. 10 is a diagram of a back perspective view of the outdoor fiber optic enclosure with the three microduct manifold fittings installed.

FIG. 10 is a diagram of a back perspective view of the outdoor fiber optic enclosure 104 with the three microduct manifold fittings 300 installed and further showing the upper mounting bracket 902 and a lower mounting bracket 1002.

Figure 11:
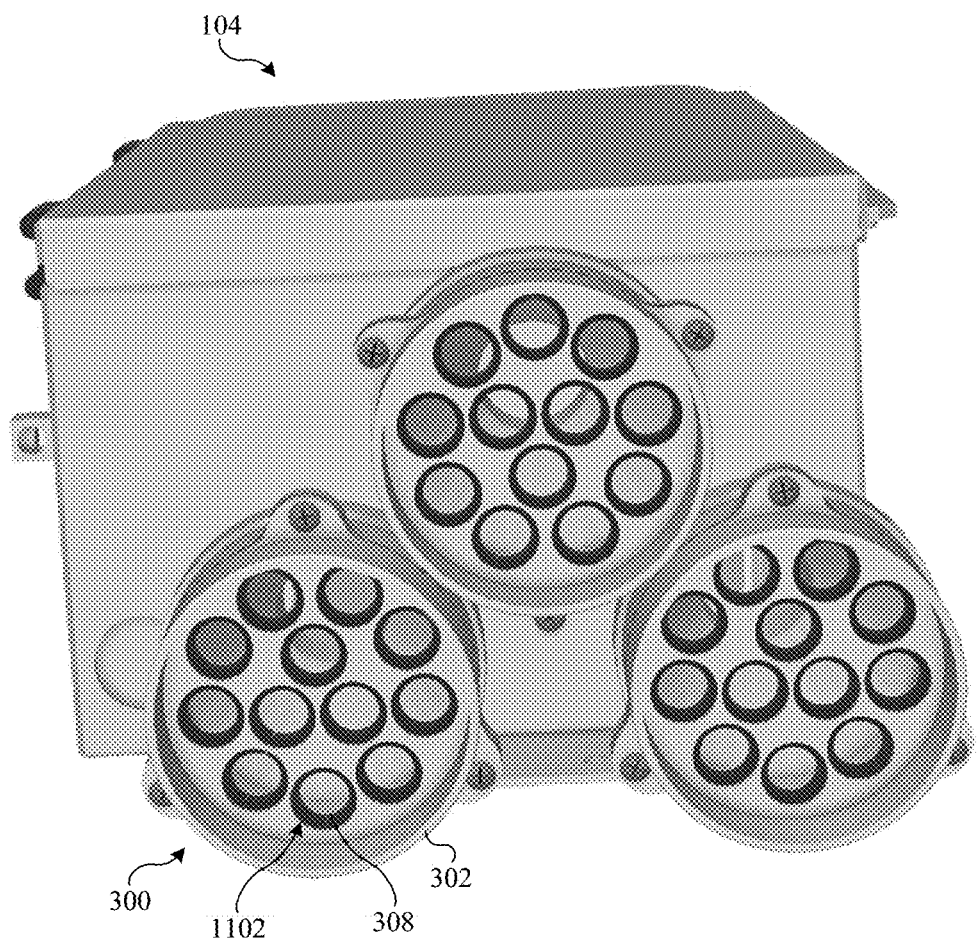
FIG. 11 is a diagram of a bottom perspective view of the outdoor fiber optic enclosure with the three microduct manifold fittings installed.

FIG. 11 is a diagram of a bottom perspective view of the outdoor fiber optic enclosure 104 with the three microduct manifold fittings 300 installed. In this example, each microduct manifold fitting has an endcap 302 with twelve (12) microduct openings 1102. Each of thirty-six (36) fibers can be extended to various destinations via a microduct connected to each of the microduct openings. Within each opening it is possible to see a portion of the gasket 308.

Figure 12:
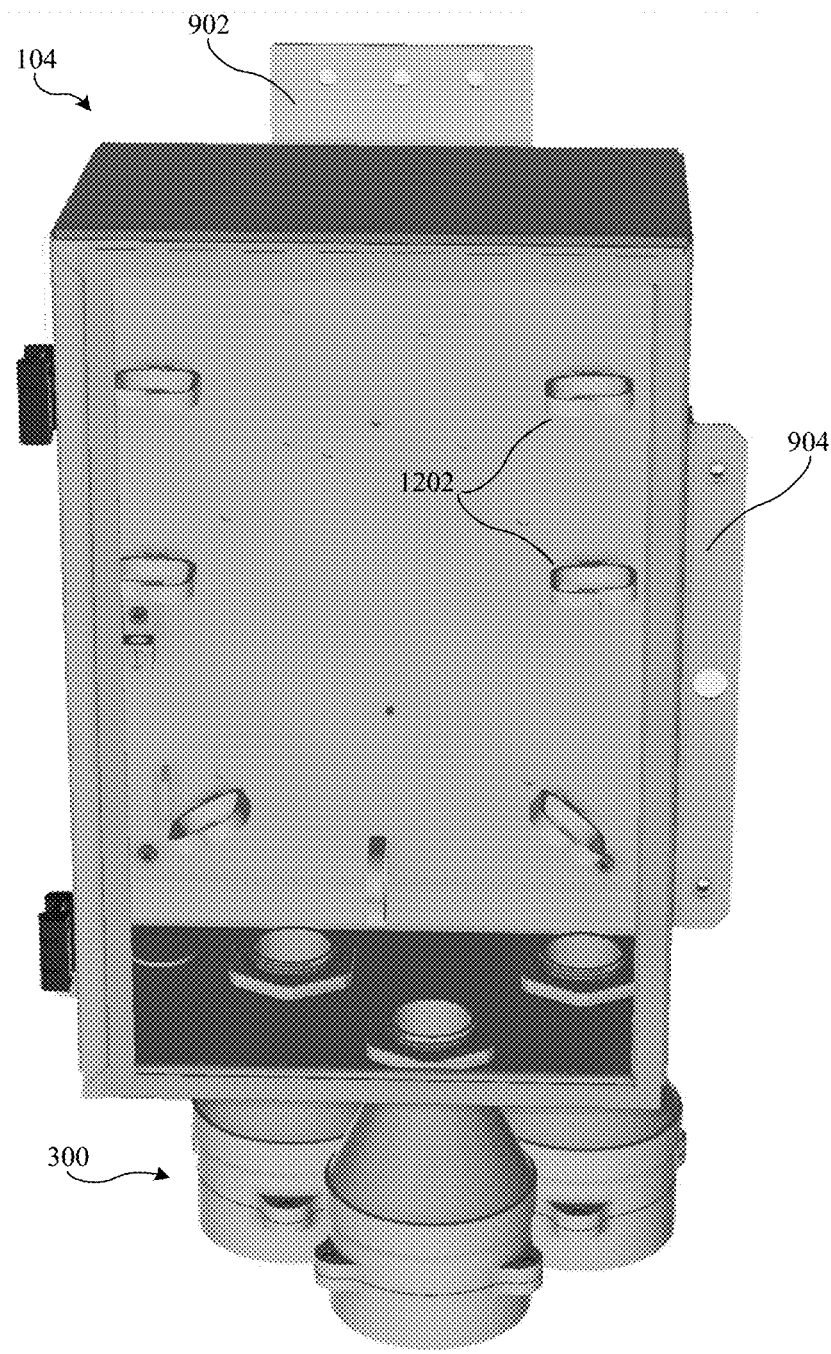
FIG. 12 is a diagram of a front perspective view of the outdoor fiber optic enclosure having the three microduct manifold fittings installed and with the lid of the enclosure removed.

FIG. 12 is a diagram of a front perspective view of the outdoor fiber optic enclosure 104 having the three microduct manifold fittings 300 installed and with the door (e.g., door 210) of the enclosure removed. Fiber management rings 1202 guide fiber within the optical enclosure 104 and handle fiber slack that may develop due to extra fiber.

Figure 13:
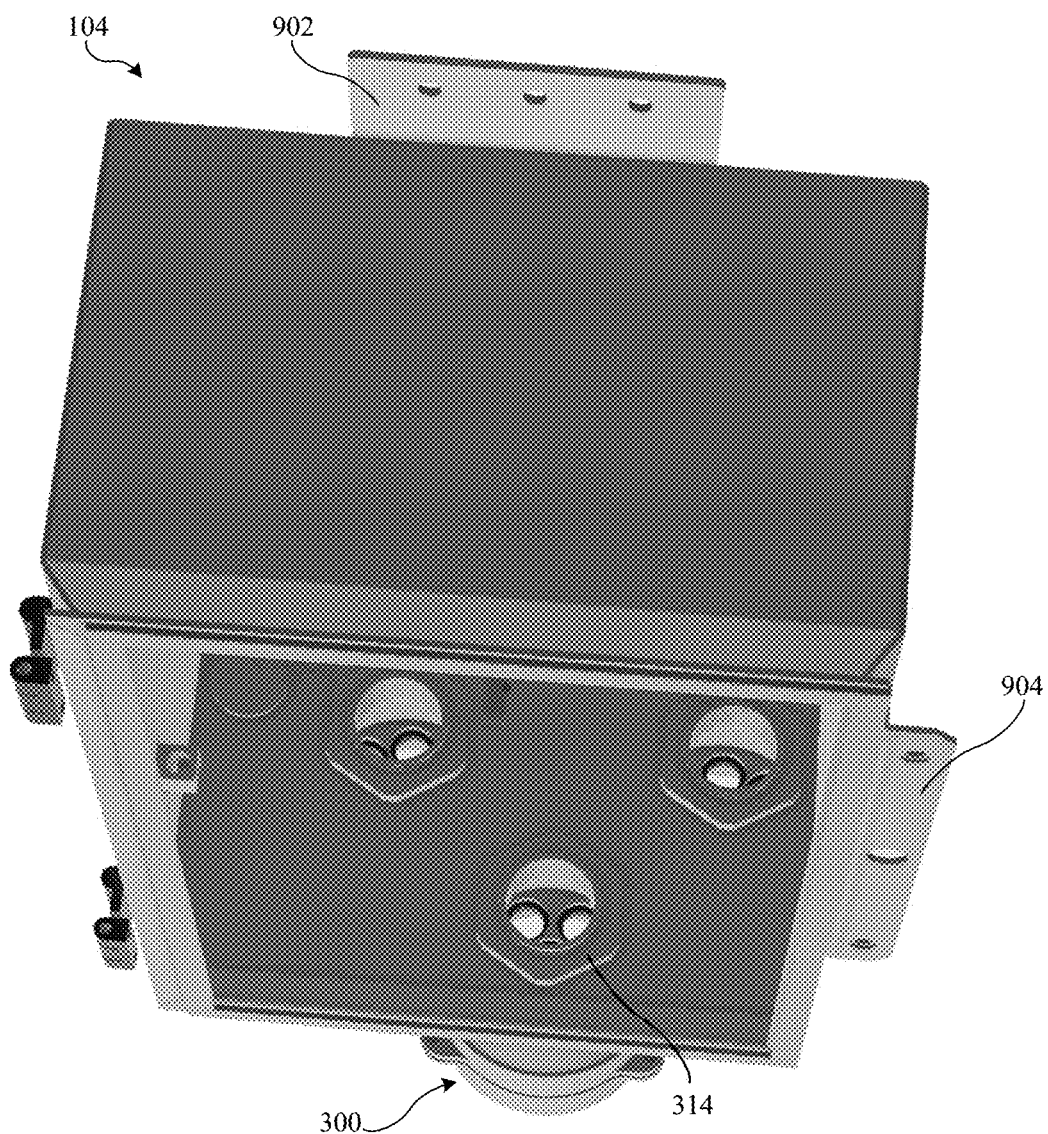
FIG. 13 is a diagram of a top-down perspective view of the outdoor fiber optic enclosure having the three microduct manifold fittings installed and with the lid of the enclosure removed.

FIG. 13 is a diagram of a top-down perspective view of the outdoor fiber optic enclosure 104 having the three microduct manifold fittings 300 installed and with the door of the enclosure removed. In this view, a hex nut 314 that secures a manifold fitting to a bottom surface of the enclosure 104 is visible.

Figure 14:
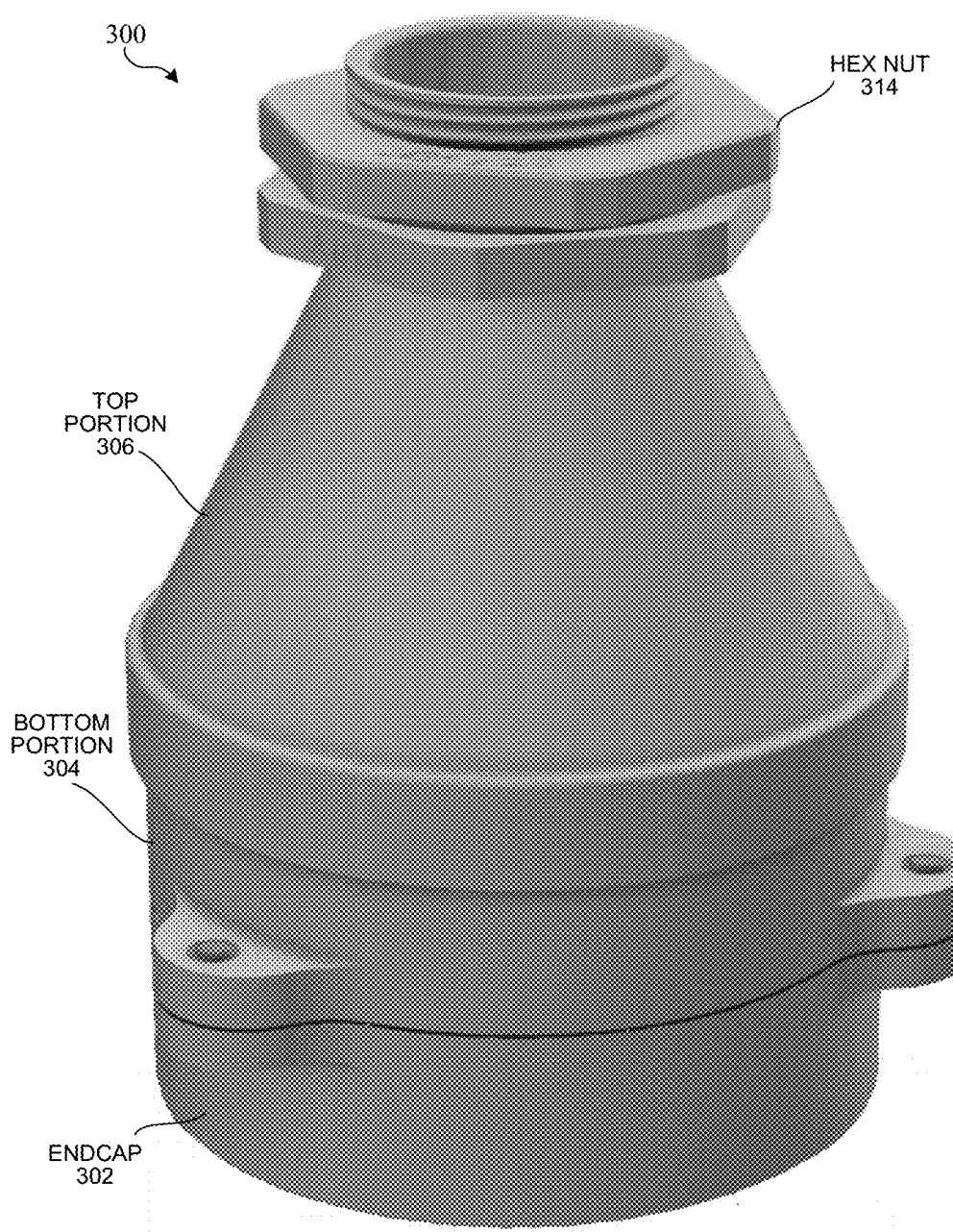
FIG. 14 is a diagram of a front perspective view of the microduct manifold fitting.

FIG. 14 is a diagram of a front perspective view of the microduct manifold fitting 300. This view shows the endcap 302, bottom portion 304, top portion 306 and hex nut 314.

Figure 15:
FIG. 15 is a diagram of a bottom perspective view of the microduct manifold fitting.

FIG. 15 is a diagram of a bottom perspective view of the microduct manifold fitting 300. This view shows the endcap 302, openings 1102 and gasket 308.

Figure 16:
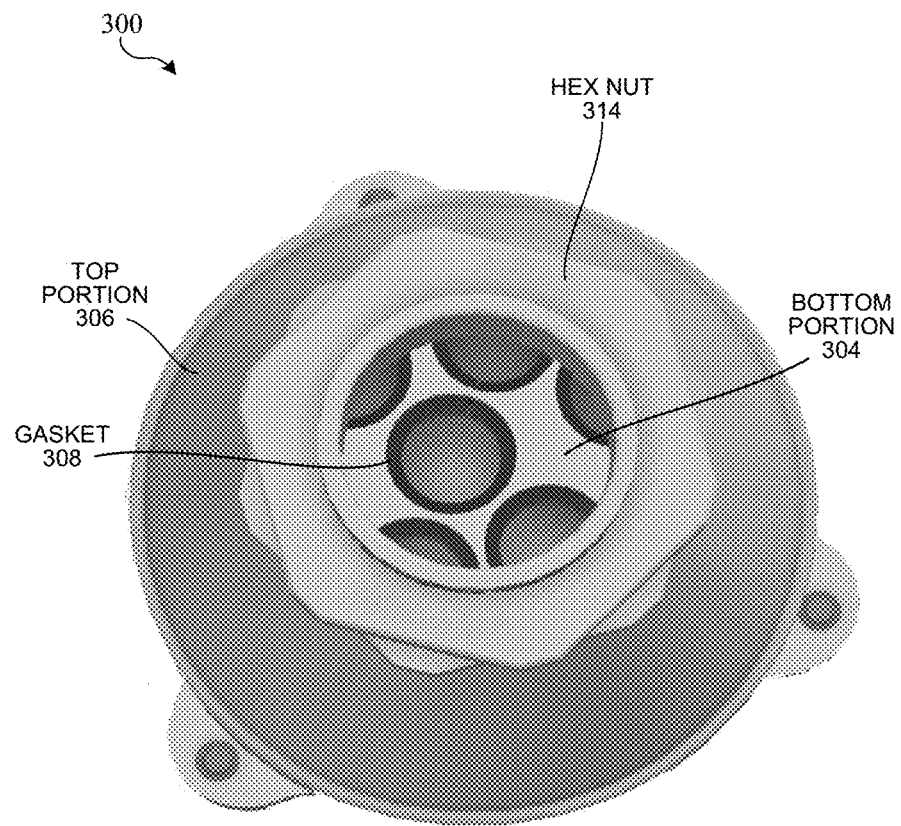
FIG. 16 is a diagram of a top perspective view of the microduct manifold fitting.

FIG. 16 is a diagram of a top perspective view of the microduct manifold fitting 300. The view shows the hex nut 314, top portion 306, bottom portion 304 and gasket 308.

Figure 17:
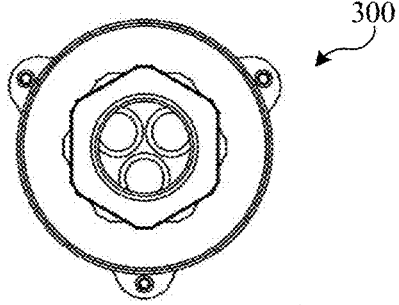
FIG. 17 is a diagram of a top view of the microduct manifold fitting.

FIG. 17 is a diagram of a top view of the microduct manifold fitting 300.

Figure 18:
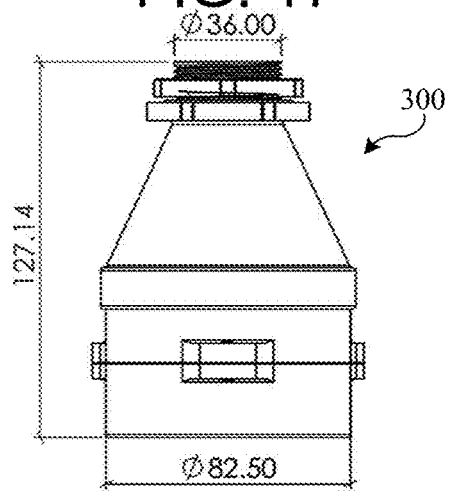
FIG. 18 is a diagram of a side view of the microduct manifold fitting.

FIG. 18 is a diagram of a side view of the microduct manifold fitting 300. All dimensions shown in FIG. 18 and in the subsequent figures are in millimeters (mm). This shows that the top diameter is 36 mm, the bottom diameter is 82.5 mm, and the length is 127.14 mm. These dimensions disclosed throughout this application are for one specific embodiment, and it is understood that other specific embodiments can be practiced without departing from the scope of the inventions as set forth in the claims below.

Figure 19:
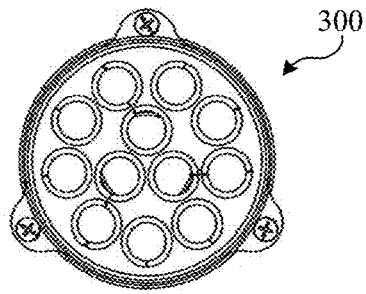
FIG. 19 is a diagram of a bottom view of the microduct manifold fitting.

FIG. 19 is a diagram of a bottom view of the microduct manifold fitting 300.

Figure 20:
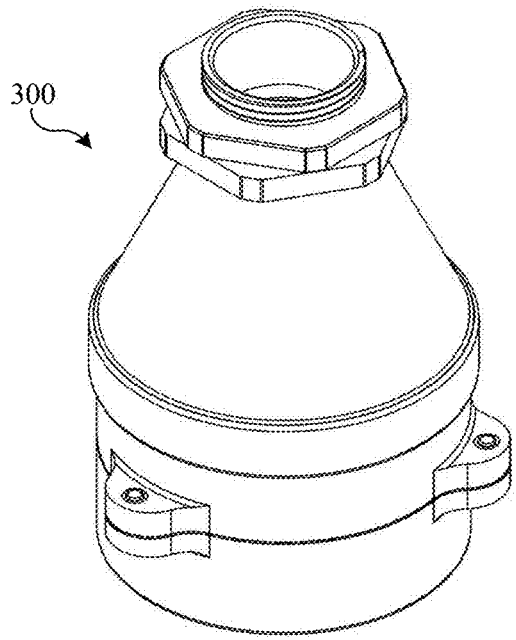
FIG. 20 is a diagram of a perspective view of the microduct manifold fitting.

FIG. 20 is a diagram of a perspective view of the microduct manifold fitting 300.

Figure 21:
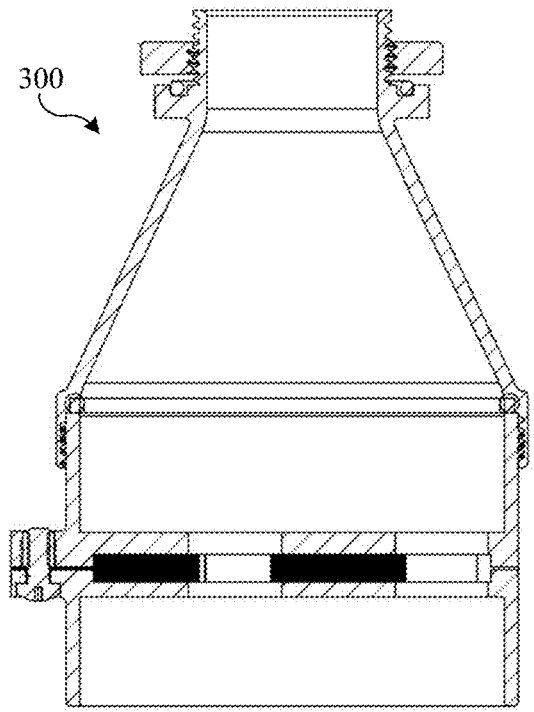
FIG. 21 is a diagram of a cross sectional view of the microduct manifold fitting.

FIG. 21 is a diagram of a cross-section view of the microduct manifold fitting 300.

Figure 22:
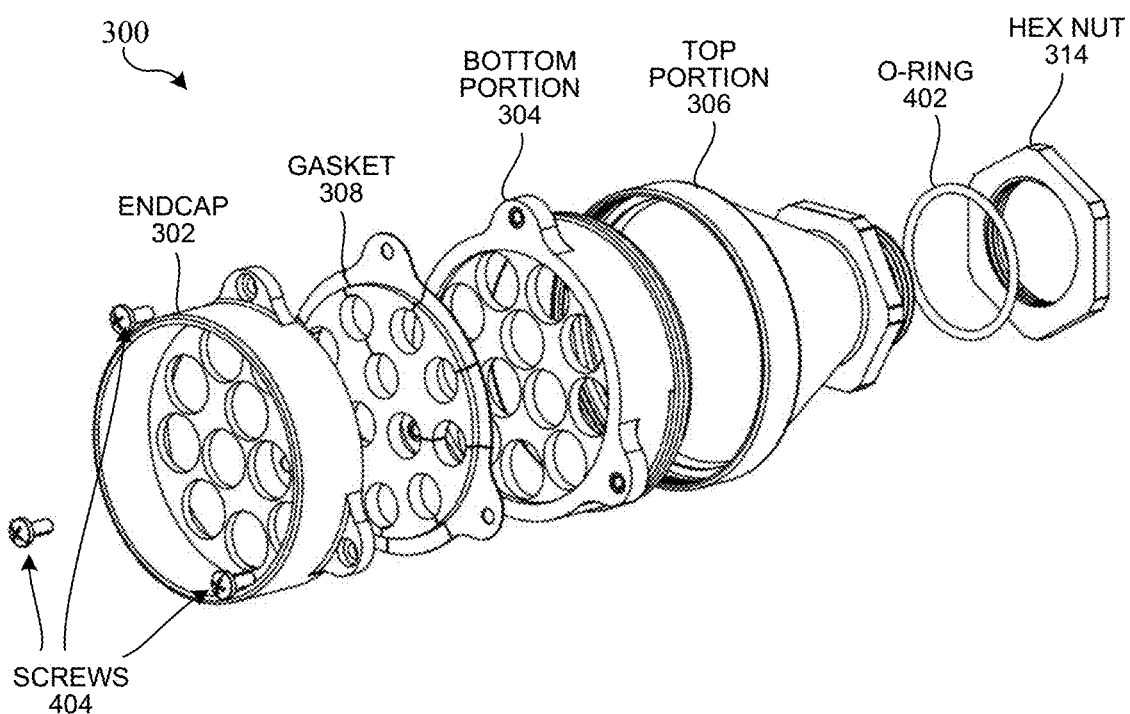
FIG. 22 is a diagram of an exploded view of the microduct manifold fitting without the microduct couplers installed.

FIG. 22 is a diagram of an exploded view of the microduct manifold fitting 300 without the microduct couplers installed. This view shows the gasket 308 without the couplers 310 installed.

Figure 23:
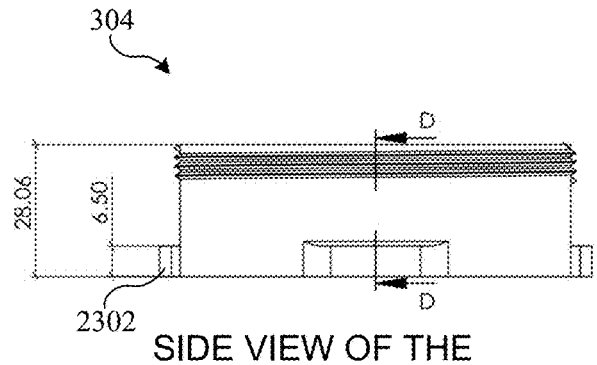
FIG. 23 is a diagram of a side view of the bottom portion.

FIG. 23 is a diagram of a side view of the bottom portion 304. This view shows that the bottom portion 304 has an overall height of 28.06 mm. A mounting feature 2302 has a height of 6.5 mm.

Figure 24:
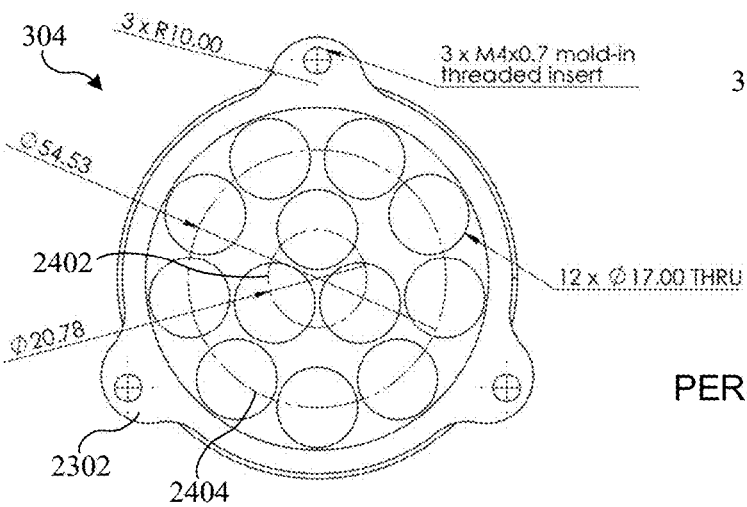
FIG. 24 is a diagram of a bottom view of the bottom portion.

FIG. 24 is a diagram of a bottom view of the bottom portion 304. This view shows that the bottom portion 304 has three mounting features 2302. Each mounting feature 2302 includes a mold-in threaded insert to accept an M4×0.7 screw. This view also shows that the bottom portion 304 includes twelve 17 mm holes (or openings). A first group of holes have their centers on an inner circle 2402 having a diameter of 20.78 mm. A second group of holes have their centers on an outer circle 2404 having a diameter of 54.53 mm.

Figure 25:
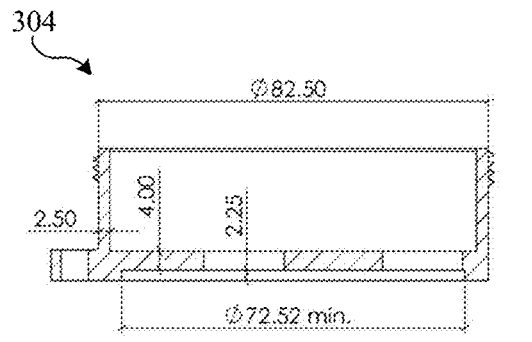
FIG. 25 is a diagram of a cross sectional view of the bottom portion.

FIG. 25 is a diagram of a cross-section view of the bottom portion 304. This view shows various dimensions of the bottom portion 304 including that the bottom portion 304 has a top outside diameter of 82.50 mm.

Figure 26:
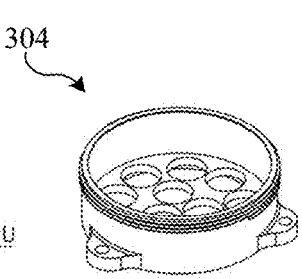
FIG. 26 is a diagram of a perspective view of the bottom portion.

FIG. 26 is a diagram of a perspective view of the bottom portion 304.

Figure 27:
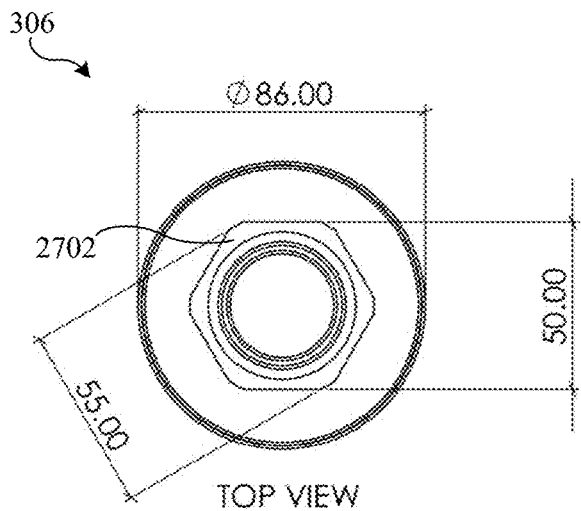
FIG. 27 is a diagram of a top view of the top portion.

FIG. 27 is a diagram of a top view of the top portion 306. This view shows that the top portion 306 includes a nut-shaped mounting flange 2702 having the dimension shown. Also, the largest outside diameter of the top portion 306 is 86 mm.

Figure 28:
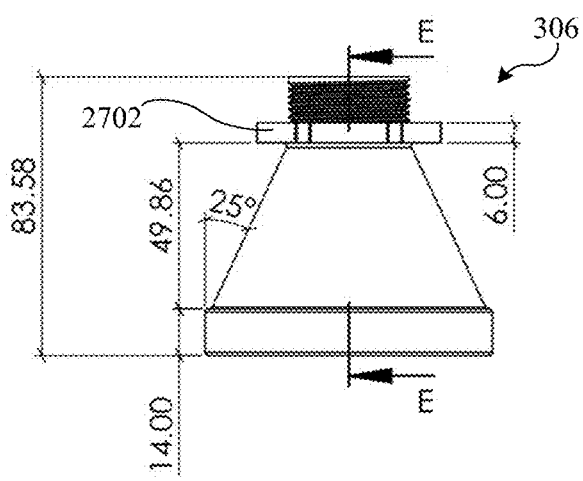
FIG. 28 is a diagram of a side view of the top portion.

FIG. 28 is a diagram of a side view of the top portion 306 that shows various dimensions.

Figure 29:
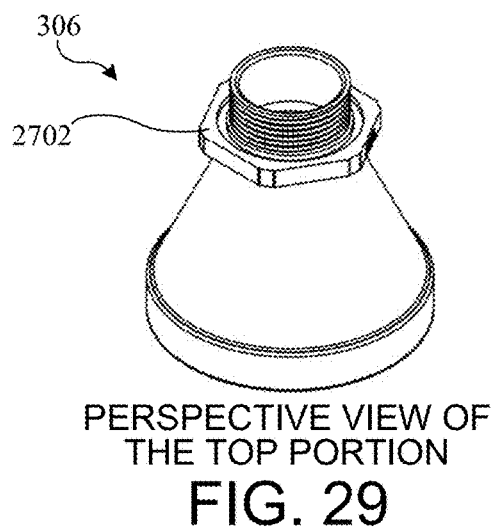
FIG. 29 is a diagram of a perspective view of the top portion.

FIG. 29 is a diagram of a perspective view of the top portion 306.

Figure 30:
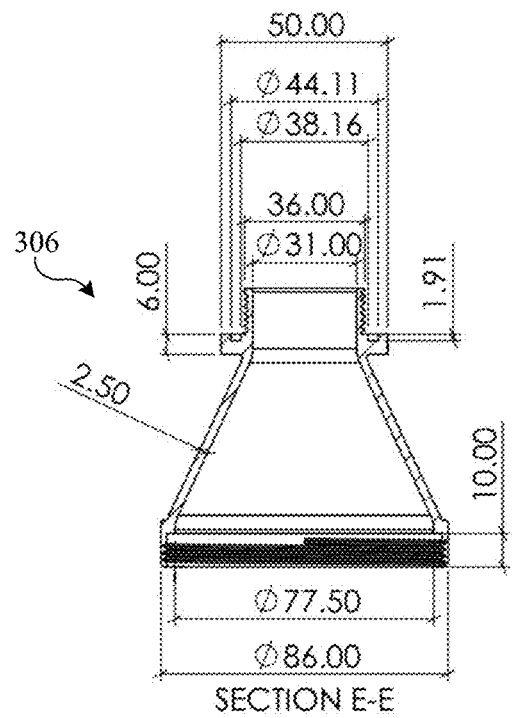
FIG. 30 is a diagram of a cross sectional view of the top portion.

FIG. 30 is a diagram of a cross-section view of the top portion 306 that shows various dimensions.

Figure 31:
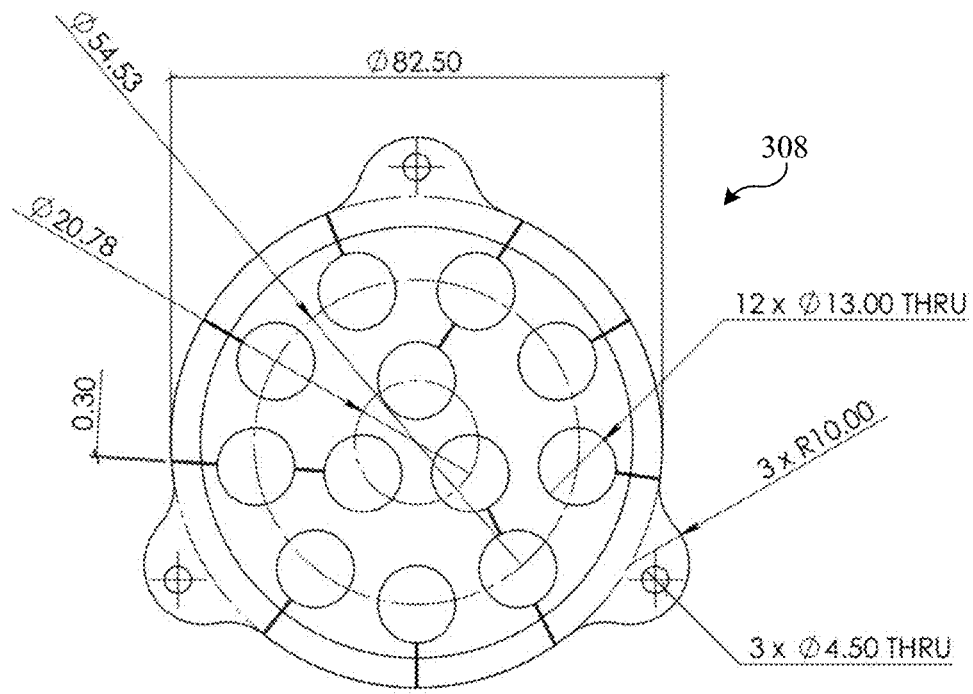
FIG. 31 is a diagram of a top view of the gasket.

FIG. 31 is a diagram of a top view of the gasket 308 and various dimensions. This view shows that the gasket 308 includes features that match with the top portion 304.

Figure 32:
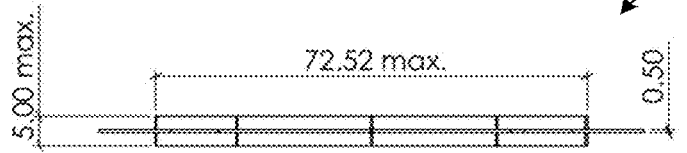
FIG. 32 is a diagram of a cross sectional view of the gasket.

FIG. 32 is a diagram of a cross-section view of the gasket 308 and various dimensions.

Figure 33:
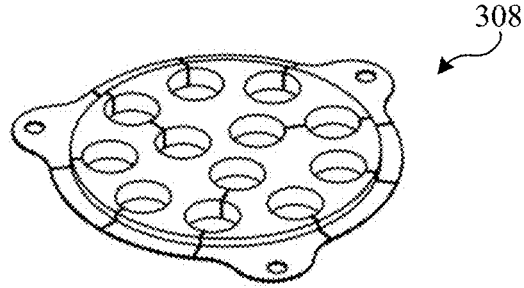
FIG. 33 is a diagram of a perspective view of the gasket.

FIG. 33 is a diagram of a perspective view of the gasket 308.

Figure 34:
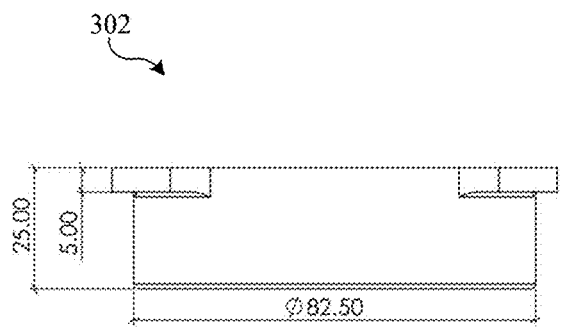
FIG. 34 is a diagram of a side view of the end cap.

FIG. 34 is a diagram of a side view of the end cap 302 showing various dimensions.

Figure 35:
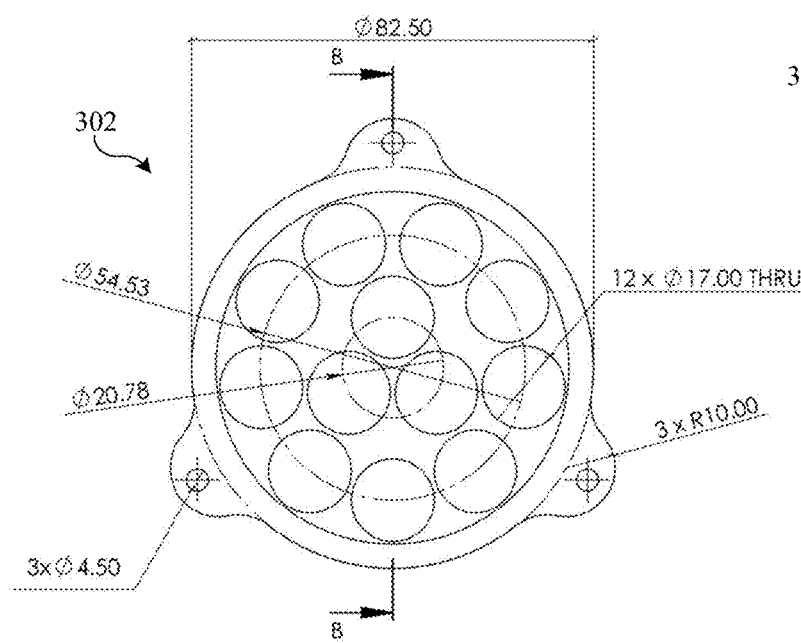
FIG. 35 is a diagram of a bottom view of the end cap.

FIG. 35 is a diagram of a bottom view of the end cap 302. This view shows that the endcap 302 includes features that match with the top portion 304.

Figure 36:
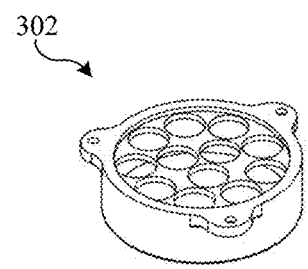
FIG. 36 is a diagram of a perspective view of the end cap.

FIG. 36 is a diagram of a perspective view of the end cap 302.

Figure 37:
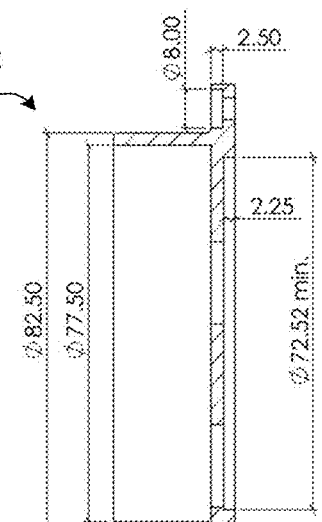
FIG. 37 is a diagram of a cross sectional view of the end cap.

FIG. 37 is a diagram of a cross-section view of the end cap 302 showing various dimensions.

Figure 38:
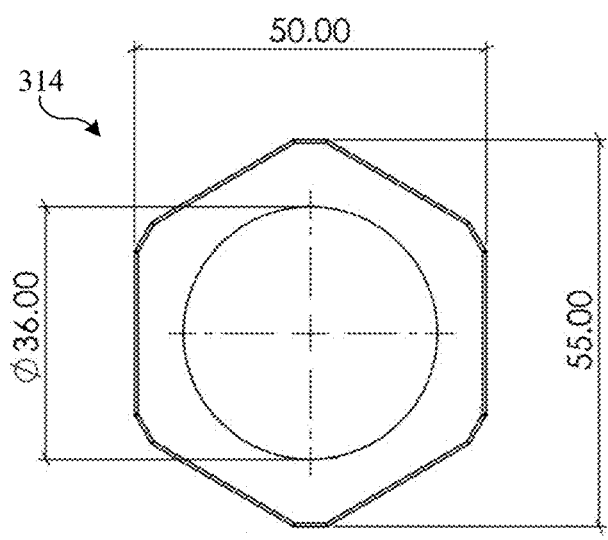
FIG. 38 is a diagram of a top view of the hex nut.

FIG. 38 is a diagram of a top view of the hex nut 314 showing various dimensions.

Figure 39:
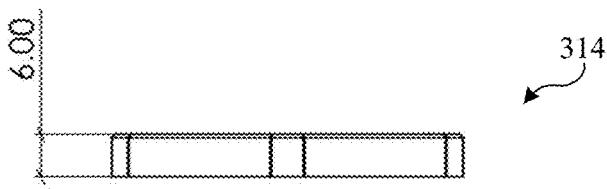
FIG. 39 is a diagram of a side view of the hex nut.

FIG. 39 is a diagram of a side view of the hex nut 314 showing various dimensions.

Figure 40:
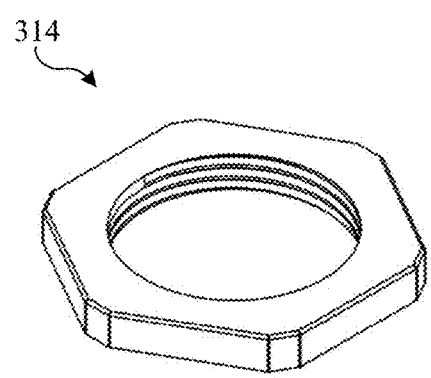
FIG. 40 is a diagram of a perspective view of the hex nut.

FIG. 40 is a diagram of a perspective view of the hex nut 314.

Figure 41:
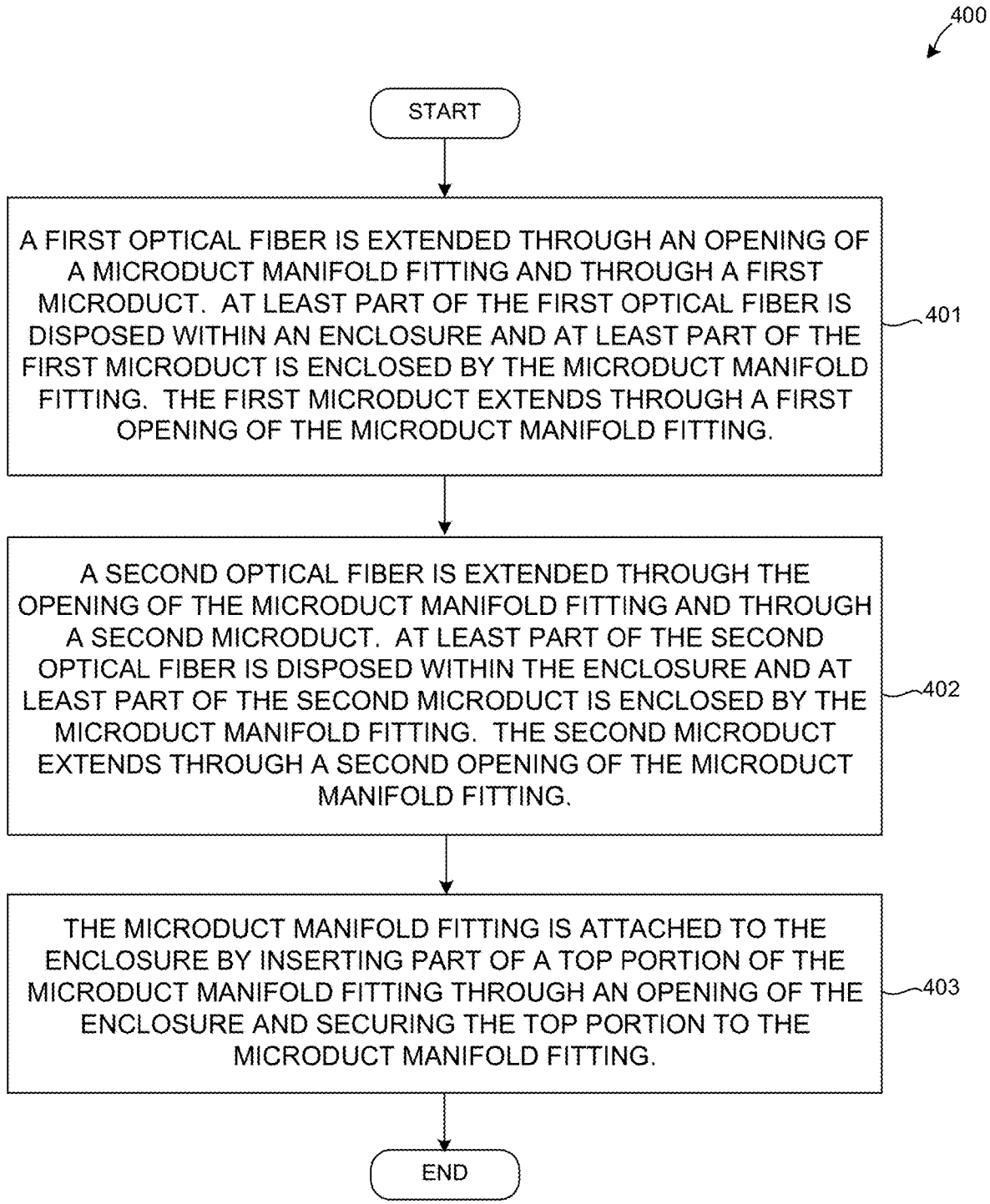
FIG. 41 is a flowchart of a method 400 in accordance with one novel aspect.

FIG. 41 is a flowchart of a method 400 in accordance with one novel aspect. In a first step (step 401), a first optical fiber is extended through an opening of a microduct manifold fitting and through a first microduct. At least part of the first optical fiber is disposed within an enclosure and at least part of the first microduct is enclosed by the microduct manifold fitting. The first microduct extends through a first opening of the microduct manifold fitting.

In a second step (step 402), a second optical fiber is extended through the opening of the microduct manifold fitting and through a second microduct. At least part of the second optical fiber is disposed within the enclosure and at least part of the second microduct is enclosed by the microduct manifold fitting. The second microduct extends through a second opening of the microduct manifold fitting.

In a third step (step 403), the microduct manifold fitting is attached to the enclosure by inserting part of a top portion of the microduct manifold fitting through an opening of the enclosure and securing the top portion to the microduct manifold fitting.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. An apparatus comprising:
   an end cap having a plurality of openings, wherein the end cap has an upper end and a lower end;
   a gasket having a plurality of openings, wherein the gasket has an upper end and a lower end;
   a bottom portion, wherein the bottom portion has an upper end and a lower end;
   a top portion, wherein the top portion has an upper opening and a lower opening, wherein the upper opening is disposed along an upper end of the top portion, wherein the lower opening is disposed along a lower end of the top portion, wherein the upper opening has a first area, wherein the lower opening has a second area, and wherein the first area is less than half of the second area;
   an optical enclosure attachment mechanism, wherein the optical enclosure attachment mechanism is attachable to the upper end of the top portion; and
   a plurality of microduct couplers, wherein each of the microduct couplers terminates a microduct and provides a path for fibers within the microduct to continue on through the apparatus.

2. The apparatus of claim 1, wherein the top portion has a conical shape.

3. The apparatus of claim 1, wherein the end cap, the gasket, the bottom portion, the top portion, and the optical enclosure attachment mechanism are assemblable such that the lower end of the gasket is disposed above the upper end of the end cap, the lower end of the bottom portion is disposed above the upper end of the gasket, and the lower end of the top portion is disposed above the upper end of the bottom portion.

4. The apparatus of claim 1, wherein the end cap, the gasket, and the bottom portion have attachment openings that are usable to secure the end cap, the gasket, and the bottom portion together.

5. The apparatus of claim 1, wherein each of the microduct couplers corresponds to one of the openings of the end cap, one of the openings of the gasket, and one of the openings of the bottom portion.

6. The apparatus of claim 1, wherein the bottom portion and top portion are attachable by screwing the lower end of the top portion to an upper end of the bottom portion.

7. The apparatus of claim 1, wherein the apparatus is a microduct manifold fitting, and wherein the microduct manifold fitting is attachable to an optical enclosure such that the upper opening of the top portion is disposed within the optical enclosure and the openings of the end cap are disposed outside of the optical enclosure.

8. The apparatus of claim 7, wherein the optical enclosure attachment mechanism comprises a hex nut, and wherein when the microduct manifold fitting is attached to the optical enclosure, the hex nut is screwed onto the upper end of the top portion such that the hex nut contacts an inner surface of the optical enclosure and lower end of the top portion is outside of the optical enclosure.

9. A method comprising:
   (a) extending a first optical fiber through an opening of a microduct manifold fitting and through a first microduct via a first microduct coupler, wherein at least part of the first optical fiber is disposed within an enclosure, and wherein at least part of the first microduct is enclosed by the microduct manifold fitting, wherein the first microduct extends through a first opening of the microduct manifold fitting, wherein the microduct manifold fitting has a top portion with an upper opening and a lower opening, wherein the upper opening has a first area, wherein the lower opening has a second area, and wherein the first area is less than half of the second area; and
   (b) extending a second optical fiber through the opening of the microduct manifold fitting and through a second microduct via a second microduct coupler, wherein at least part of the second optical fiber is disposed within the enclosure, and wherein at least part of the second microduct is enclosed by the microduct manifold fitting, and wherein the second microduct extends through a second opening of the microduct manifold fitting.

10. The method of claim 9, further comprising:
    (c) attaching the microduct manifold fitting to the enclosure by inserting the upper opening of the top portion of the microduct manifold fitting through an opening of the enclosure and securing the top portion to the microduct manifold fitting.

11. The method of claim 10, wherein the microduct manifold fitting is secured by screwing a nut onto the top portion of the microduct manifold fitting after the top portion is passed through the opening of the enclosure.

12. The method of claim 9, wherein the first microduct coupler and the second microduct coupler are entirely disposed within the microduct manifold fitting, wherein the first microduct terminates at the first microduct coupler, and wherein the second microduct terminates at the second microduct coupler.

13. The method of claim 12, wherein the first microduct coupler and the second microduct coupler extend through separate holes of a gasket.

14. An apparatus comprising:

a gasket having a plurality of openings; and couplers that fit into the openings, one coupler per opening, to form a weather resistant assembly, wherein at least one end of each coupler is sized to mate with and terminate a microduct, and wherein the couplers include through-holes to pass fiber optic cable; and a housing that surrounds the gasket to form a weather resistant seal, wherein the housing has a surface mounting feature on a first end and a receptacle feature on a second end to receive one or more microducts that mount on the couplers, wherein the surface mounting feature has a first area, wherein the receptacle feature has a second area, and wherein the first area is less than half of the second area.

15. The apparatus of claim 14, wherein the housing comprises:

a top portion that includes the surface mounting feature and a second end;

a bottom portion coupled to the second end; and an endcap coupled to the bottom portion, wherein the gasket is secured between the bottom portion and the endcap.

16. The apparatus of claim 14, wherein both the bottom portion and the endcap include openings to accept the couplers.

17. The apparatus of claim 14, wherein the housing and the gasket are part of a microduct manifold fitting.

18. The apparatus of claim 14, wherein the couplers are microduct couplers.

19. The apparatus of claim 14, wherein the weather resistant assembly is configured to couple microducts carrying optical fibers to fibers internal to an outdoor fiber optic enclosure.

* * * * *